Jan. 13, 1925.

C. MEIER 1,522,787

CAST UNIVERSAL JOINT AND PROCESS THEREFOR

Filed May 27, 1921      2 Sheets-Sheet 1

Charles Meier Inventor

By N.S. Amstutz

Attorney

Jan. 13, 1925.
C. MEIER
1,522,787
CAST UNIVERSAL JOINT AND PROCESS THEREFOR
Filed May 27, 1921 2 Sheets-Sheet 2
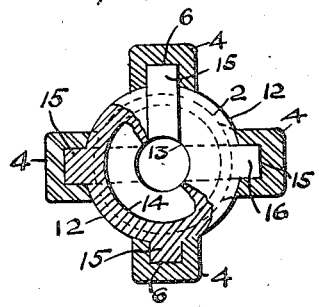
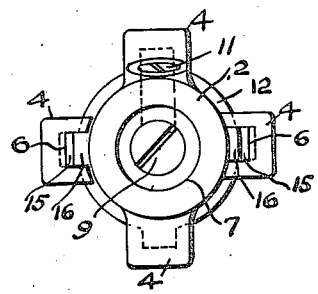
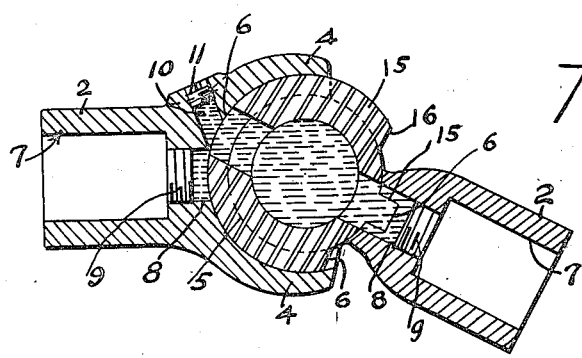
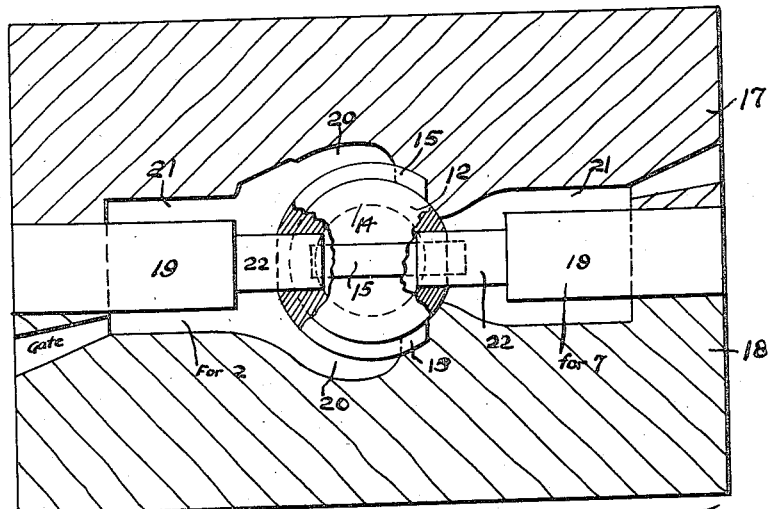
Charles Meier Inventor
By N. S. Amstutz
Attorney.

Patented Jan. 13, 1925.

1,522,787

UNITED STATES PATENT OFFICE.

CHARLES MEIER, OF VALPARAISO, INDIANA.

CAST UNIVERSAL JOINT AND PROCESS THEREFOR.

Application filed May 27, 1921. Serial No. 473,000.

*To all whom it may concern:*

Be it known that I, CHARLES MEIER, a citizen of Germany, residing at Valparaiso, in the county of Porter and State of Indiana, have invented certain new and useful Improvements in Cast Universal Joints and Processes Therefor, of which the following is a specification.

My invention relates to improvements in cast universal joints and process therefor, and it consists more especially of the features hereinafter pointed out in the annexed claims.

The purpose of my invention is to provide a universal joint with a minimum number of parts; that is cast in assembled relation; that may be devoid of machining at its sliding surfaces; that is automatically lubricated; that avoids the use of pivot screws, etc., commonly forming a part of universal joints; that is die cast with the several parts movable on each other but held against dissemblements through the casting steps, without any further assembling or the use of separate retaining fixtures of any kind whatever.

With these and other purposes in view, I illustrate in the accompanying drawings such instances of adaption as disclose the broad underlying features without limiting myself to the specific details shown thereon and described herein.

Fig. 5 is an end elevation of the ball and the adjacent cooperating parts in section.

Fig. 6 is an elevation of the left-hand end of Fig. 1.

Fig. 7 is an elevation in section similar to Fig. 2, but with the joint members out of alignment.

Fig. 8 is a diagrammatic view of a mould and core showing the relation thereof to the ball center of the joint during the process of casting a completely assembled mechanism.

Figure 1:
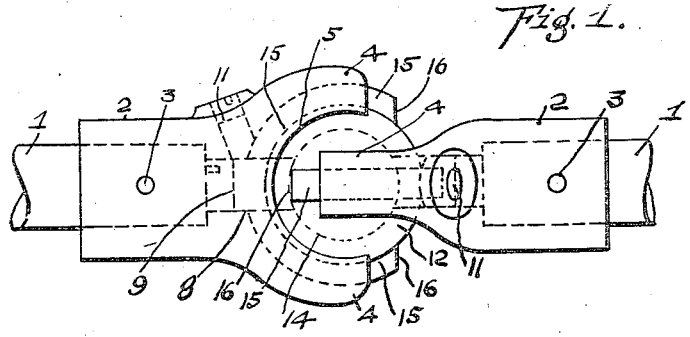
Figure 1 is a side elevation of the parts assembled.
Figure 2:
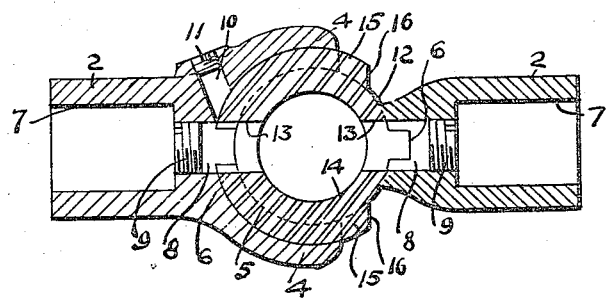
Fig. 2 is elevation showing the parts in section on the same side elevation as Fig. 1.
Figure 3:
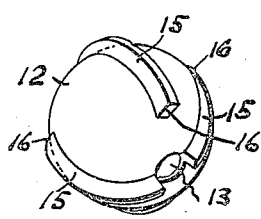
Fig. 3 is a perspective of the ball forming the connector between the two main parts of the joint.
Figure 4:
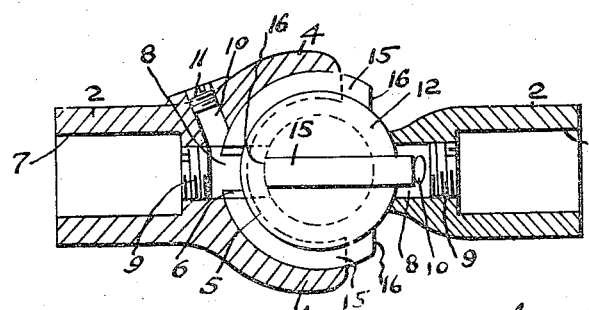
Fig. 4 is a side elevation similar to Fig. 1, showing the ball connector in elevation and the other parts in section.

This invention is unique and unusual in the process through which the successive steps lead to a complete finished article, whose parts have movement with respect to each other, without any other procedure than that of pouring the metal into the required moulds or dies.

When the parts are to be formed by means of die-casting, the dies will be made with such lines of separation, etc., as will best lend themselves to the rapid moulding of the parts. These special features form an accessory part of this invention, and as they may be subject to much variation are not shown, in view of the fact that the steps involved in the production of the articles in accordance with the disclosure herein made are understandable from the drawings accompanying and forming a part of this description.

Instead of machining the articulate parts of a universal joint, I simply die-cast them, using one member as a component part of the die or mould in which the complete device is cast. As this part has itself been die-cast separately, its surfaces are smooth; in consequence, the metal which flows around such surfaces will also be as smooth as though it rested against the side walls of the die itself. On cooling, the parts are ready to be assembled on any pair of related shafts that are to be rotated at an angle to each other.

In the exemplification shown, the two shafts 1 are secured in openings 7 of hubs 2 by means of pins 3. These hubs have extensions 4 in which a curved groove 6 is formed, the hollow of the fork being indicated by 5. The forks 4 are a part of a circular arc of more than 180 degrees extent and this arc is the same in both members. At the inner end of the shaft openings 7, lubricant openings 8 are formed, these are later tapped and plugs 9 are threaded therein. Diagonal holes 10 are drilled so as to lead into the openings 8 in advance of the plugs 9 and screws 11 close these openings which are used to fill the interior cavities with grease or any desired kind of lubricant.

The third member of the universal joint placed between the duplicate parts 2, is a hollow ball 12 that has two openings 13 placed diametrically opposite each other. These openings are formed midway between the ends 16 of the arcuate ribs 15 that are placed 90 degrees apart on the surface of the ball 12. In length, these ribs are longer than the forks 4, so as to provide a sufficient length of bearing when the joint is operating at a considerable angle. In the interior 14 of the ball 12, a storage space for lubricant is found. This communicates at all times with the cavities 8 and through them with the inlet openings 10, thus insuring an automatic supply of lubricant to the ribs 15 and grooves 6. In Fig. 7, the action of the grease may be followed as the main parts 2 are shown at an angle to each other.

In Fig. 8 is shown in diagrammatic manner, the assemblage in a mould or die 17—18 of a metallic ball 12 complete in all respects, held in position by the spherical surface of the ball outside of the ribs 15. A core 22 enters each opening 13 of the ball and thus centers the openings with the cavities 8 to be formed by these cores. The larger part 19 of the cores, when die casting instead of sand moulding is used, may, with its smaller diameter end 22, be made of steel in any desired shape, square, hexagonal, or round as the exigencies of practice may demand, to form the shaft end opening 7 of the parts 2. Open areas 21 of the mould parts 17 and 18 permit the metal to flow in through suitably placed "gates" to form the hubs 2, while the cavities 20 define the location of the forks 4.

The successive steps in carrying out my process are simple and few in number. First, the central member having arcuate ribs thereon is formed, of spherical or other shape, in the metal of which the final device is to be made or any desired change therefrom; second, the central member is placed in position in a suitable mould or die which has related cavities adjacent to, and at places connected with, such member; third and finally, the cavities are filled with molten metal, under gravity or under pressure as may be desired.

This invention is not comparable with the practice of inserting stationary metal parts into moulds and casting metal around them to form an entity with the parts attached thereto in the finished article, hence the features of the invention are of great importance and the results which are attained thereby are quite out of the ordinary.

What I claim is:

1. The process of casting universal joints, consisting in casting a spherical member having arcuate ribs thereon at right angles to each other, in providing a die with cavities therein, in causing the cast spherical member to become a related part of the die cavities, and in filling the cavities with molten metal to partially enclose the arcuate ribs beyond the center of the spherical member whereby an assembled articulate article is completed in one major operation.

2. The process of forming universal joints consisting in forming a central member having bearing surfaces thereon at 90 degrees apart and on opposite side of such member, in using said member as a part of a mould or die, and in casting shaft end members around the bearing surfaces of the central member.

3. The process of die-casting universal joints consisting in forming a central bearing member, in combining such member with a mould, having related shaft-end openings or cavities connecting with said member, and in filling such cavities with liquid metal under pressure so as to permanently include the bearing member in articulate relation to the solidified ends.

4. The process of forming three-piece universal joints consisting, first, in forming a central or bearing member with retaining configurations thereon, second, in forming a mould or die with a seat for the bearing member and cavities on opposite sides of said seat, third, in filling the cavities with molten metal under pressure, and fourth, in cooling the metal to complete an articulate joint in which the parts have extreme angular movement in contact with each other and rotating in unison without becoming disengaged.

5. The process of forming an articulate cast universal joint, consisting in forming a bearing center with retaining configurations thereon, and in casting shaft ends in contact with said center.

6. The process of forming a cast universal joint, consisting in first forming a bearing center, and in casting shaft ends in contact with said center while maintaining the ends disconnected from each other, and in holding the parts assembled in articulate relation to each other without external fastenings.

7. The process of forming universal joints, without external fastenings, consisting in casting shaft ends in articulate and retentative contact with a separately formed bearing center, the said ends being susceptible of movement on the center independently of each other.

8. The process of forming universal joints, consisting in casting separate shaft-ends in articulate angular relation to each other on a formed bearing member having intergral retaining means formed thereon adapted to prevent the dissembling of the united parts while holding them in engagement to be rotated in unison.

9. The process of forming universal joints, consisting in forming a spherical bearing center with retaining configurations thereon disposed in planes at right-angles to each other, and in casting separate and independent shaft ends in articulate contact with said center and in self retaining relation thereon.

In testimony whereof I affix my signature.

CHARLES MEIER.